(12) United States Patent
Cobben (10) Patent No.: US 8,563,895 B2
(45) Date of Patent: Oct. 22, 2013

(54) METHOD AND DEVICE FOR PROCESSING A MOVABLE SUBSTRATE BY MEANS OF LASER

(75) Inventor: Johannes Ignatius Marie Cobben, Veldhoven (NL)

(73) Assignee: IAI Industrial Systems B.V., Veldhoven (NL)

( * ) Notice: Subject to any disclaimer, the term of this patent is extended or adjusted under 35 U.S.C. 154(b) by 397 days.

(21) Appl. No.: 12/863,830

(22) PCT Filed: Jan. 22, 2009

(86) PCT No.: PCT/NL2009/050026
§ 371 (c)(1),
(2), (4) Date: Aug. 30, 2010

(87) PCT Pub. No.: WO2009/093899
PCT Pub. Date: Jul. 30, 2009

(65) Prior Publication Data
US 2011/0168683 A1 Jul. 14, 2011

(30) Foreign Application Priority Data
Jan. 24, 2008 (NL) ..................................... 2001212

(51) Int. Cl.
*B23K 26/00* (2006.01)

(52) U.S. Cl.
USPC .................................. 219/121.72; 219/121.67

(58) Field of Classification Search
USPC .......................................... 219/121.7, 121.72
See application file for complete search history.

(56) References Cited

U.S. PATENT DOCUMENTS

| 3,970,819 A | 7/1976 | Gates et al. |
| 2004/0159637 A1 * | 8/2004 | Herke et al. ............. 219/121.18 |

FOREIGN PATENT DOCUMENTS

| EP | 1449798 A | 8/2004 |
| GB | 2303095 A | 2/1997 |
| JP | 60177987 | 9/1985 |
| JP | 2001105170 A | 4/2001 |
| JP | 200823548 A | 2/2008 |

OTHER PUBLICATIONS

International Search Report for PCT/NL2009/050026 dated May 13, 2009.
CN Application No. 200980102981.8, Office Action mailed Oct. 15, 2012.

* cited by examiner

*Primary Examiner* — Jarrett Stark
*Assistant Examiner* — Lawrence Tynes, Jr.
(74) *Attorney, Agent, or Firm* — Banner & Witcoff, Ltd.

(57) ABSTRACT

The invention relates to a method for processing a movable substrate by means of laser, wherein the processing results in the release of material separated from the substrate, wherein during processing of the substrate a higher pressure prevails on the side of the substrate where the substrate is impinged by the laser beam than on the other side of the substrate, and to a device for performing such a processing, wherein the device comprises guide means for guiding the substrate and laser processing means adapted to cast onto the substrate a laser spot which processes the substrate in a laser processing zone, and comprises means for generating a higher pressure on the side of the substrate where the substrate is impinged by the laser beam than on the other side of the substrate.

18 Claims, 5 Drawing Sheets

METHOD AND DEVICE FOR PROCESSING A MOVABLE SUBSTRATE BY MEANS OF LASER

CROSS REFERENCE TO RELATED APPLICATIONS

This application is a National Stage application of co-pending PCT application PCT/NL2009/050026 filed Jan. 22, 2009, which application claims benefit from Netherlands Application No. 2001212 filed Jan. 24, 2008. These applications are hereby incorporated by reference in their entireties.

The invention relates to a method for processing a movable substrate by means of laser, wherein the processing results in the release of material separated from the substrate.

The invention also relates to a device for processing a movable substrate by means of laser, wherein the processing results in the release of material separated from the substrate, wherein the device comprises guide means for guiding the substrate and laser processing means, which laser processing means are adapted to cast onto the substrate a laser spot which processes the substrate in a laser processing zone.

When holes are cut in a substrate, there results a separated part which must be discharged in controlled manner in order to prevent the part from moving in the direction toward the laser beam and there absorbing so much energy from the laser beam that the processing stops. Nor may an only partially cut-out part fold back toward the laser beam and cover a part of the substrate still to be processed.

The object of the invention is to provide such a method and device wherein these drawbacks are obviated.

This object is achieved in that, during processing of the substrate, a higher gas pressure prevails on the side of the substrate where the substrate is impinged by the laser beam than on the other side of the substrate.

This object is further achieved by such a device which is provided with means for generating a gas pressure on the side of the substrate where the substrate is impinged by the laser beam which is higher than the gas pressure on the other side of the substrate.

Experience has shown that the above stated measures are not always sufficient for full removal of the released material.

According to a preferred embodiment, the substrate is forced into a curved position during or after the processing. As a result of the stiffness of the material the part still partially attached to the substrate will not follow the change of direction of the substrate. The part is hereby separated more easily from the substrate. This separation is also enhanced by the mass inertia of the partially detached parts; this is because they tend to follow their original path, while the substrate follows a different path as a result of the change of direction.

The invention is likewise implemented by such a device, wherein the guide means are adapted to subject the substrate to at least one curvature.

According to another preferred embodiment, the substrate is moved into a curved position after processing. Possibly cut-out parts are then more completely separated from the substrate so that they are detached more easily from the substrate. This is the case for instance with coarse-grain sandpaper, wherein the grains impede the effectiveness of the laser beam in the substrate and the substrate is not fully pierced everywhere along the periphery of the part to be cut out. Due to the curved position into which the substrate is forced after the processing, i.e. after detaching as much as possible of the part to be cut out, the part to be cut out is subjected to an extra force, whereby it detaches more easily from the substrate.

This embodiment likewise provides the measure that the guide means are adapted to subject the substrate to a curvature after the substrate has been processed with laser.

It is structurally attractive when the guide means comprise a rotatable roller which is adapted to cause the curvature after the substrate has been processed by laser.

It is however also possible to subject the substrate to a curvature during the processing. Smaller, already wholly cut-away parts can hereby already be discharged. It is further practically always necessary in laser processing for the laser beam to be focussed to a spot at the position of the surface of the substrate or within the thickness of the substrate. In addition to the use of suitable optical means for the purpose of manipulating the focussing, the substrate must be located at a defined position. For a substrate in the form of a web or continuous strip this is usually achieved by holding the web under a mechanical tension in the direction of movement and guiding it over two rollers on either side of the laser operation zone. The web is hereby tensioned between the two rollers and the position thereof, particularly in the main direction of the laser beam, is well-defined. As a result of for instance changes in the tensile force of the web, air pressure differences and variations on either side of the substrate in the form of a web, deviations can nevertheless occur in the desired position of the substrate. This is even more so the case with a substrate in the form of separate leaves or sheets, wherein the front edge is gripped by means of gripping members and wherein the rest of the leaf or sheet is drawn against a suction plate. In both cases it moreover becomes more difficult to accurately maintain the position of the substrate when the laser operation zone is larger. The above stated measures according to the preferred embodiment can be applied in order to also reduce these problems. These measures make use of the stiffness of the usually limp substrate which is increased when a curvature is arranged in the substrate. In other words, the curved substrate is more resistant than a flat substrate to deflections perpendicularly of the substrate. This embodiment also proposes that the guide means be adapted to subject the substrate to a curvature in the laser operation zone.

The stiffness of the substrate usually increases with a smaller radius of curvature. There are other considerations which play a part in determining the radius. The laser beam must thus be aimed at the substrate from the convex or the concave side of the substrate. When the laser beam impinges on the convex side of the substrate, high demands are made of the optical means for holding the laser spot in focus. This is because, in the direction toward the convex side, not only the greater distance already present in the case of a flat substrate must be compensated in the case of deflections of the laser beam relative to the perpendicular position, but also the greater distance resulting from the curvature. Another drawback is that the laser beam impinges on the substrate at an angle which is considerably smaller than 90°, whereby the accuracy of the positioning in the plane of the substrate decreases, while the shape of the spot—assuming a circle when the laser beam impinges on the substrate at a right angle—also becomes elliptical. The laser power per surface area hereby decreases to a significant extent. In extreme cases an increase in the laser power will even be necessary for the purpose of satisfactorily performing the desired processing. In order to alleviate these drawbacks a preferred embodiment provides the measure that the concave side of the substrate is directed toward the laser beam. The same embodiment likewise provides the measure that the guide means are adapted to direct the concave side of the substrate toward the laser beam. The deviations on the concave side of the substrate and the deviations increasing the distance on the convex side at least partially compensate each other, whereby fewer demands are made of the optical means responsible for keeping the laser spot in focus. This measure also has the advantage that parts which become detached during the laser processing come to lie on the side of the substrate remote from the laser processing means, where there is no danger of blocking the laser beam and more space is usually available. It is noted here that the axis of the curvature can extend in different directions; not only parallel to the direction of movement and perpendicularly thereof, but also at an angle smaller than 90° relative to the direction of movement.

Yet another preferred embodiment provides the measure that during the processing the substrate is curved in an arc, the centre of which coincides with the rotation axis of a controllable deflecting mirror, which deflects the laser beam in the plane of the curvature of the substrate, and the measure that the guide means are adapted to force the substrate into a circular arc and that the axis of the deflecting mirror of the laser processing means is situated in the centre of the circular arc. As a result of these measures the distance between the deflecting mirror and the substrate remains the same, irrespective of the angle of deflection of the deflecting mirror.

As already stated, when processing takes place use is usually made, during the movement of the substrate, of an elongate laser operation zone, the longest distance of which does not necessarily extend in the direction of movement, although it usually does so. The deflections of the laser beam in this direction are therefore greater than those in the direction transversely thereof. Most advantage is drawn from this measure by having the axis of the curvature extend transversely of the largest dimension of the laser operation zone.

Because, as stated above, the longest dimension of the elongate laser operation zone usually extends in the direction of movement, it is attractive that the axis of the curvature extends transversely of the direction of movement of the substrate.

The desired curvature of the substrate can be obtained in different ways, for instance by a curved guide along which the substrate is guided, which must be provided with pressing means for urging the substrate against the guide. The curved guide can take the form of a fixedly disposed cylinder segment or of a rotatable cylinder.

It is however also possible to embody the curved guide in the form of an air bearing. An air bearing has the advantage of a minimal friction so that, as a result of the minimal friction between substrate and air bearing, the means for urging the substrate against the air bearing are likewise able to drive the substrate in the direction of movement, so that this embodiment is particularly, though not exclusively, suitable for transporting substrate in the form of separate sheets. Due to the minimal contact or even absence of contact between air bearing and substrate, this embodiment is also particularly suitable for processing substrates whose surface can be damaged by contact.

According to yet another embodiment, the substrate is urged against the at least one guide by at least one drive belt and the pressing means comprise at least one drive belt which is adapted to press the substrate against each of the guides. The drive belt is here also particularly suitable for co-displacing the substrate, this being particularly important for substrate in the form of sheets. Instead of a drive belt or belts, use can also be made of rollers to press the substrate against the guide, possibly in combination with drive belts.

Both the rotatable cylinders and the air bearings can take a dual form in order to provide space for the laser processing means. The embodiment then results wherein the device comprises two rotatable concentric cylinders or two parallel extending air bearings, and wherein the laser processing means are situated at least partially between the two cylinders or air bearings.

For the purpose of simplifying the construction and being able to easily adapt the relevant device to different substrate sizes and processing positions on the substrate, it is attractive when the rotatable cylinders or the air bearings and the pressing means are placed on a single carrier together with means for discharging resulting separated material and the carrier can preferably be displaced and fixed transversely of the direction of transport of the substrate, as required by the substrate for processing.

Finally, shielding means can be placed on the same carrier for shielding the surrounding area from laser radiation, whereby these means are displaced simultaneously with the displacement of the processing means.

Although the measures according to the invention particularly applicable in the above described situation, in which the substrate moves continuously, they are also applicable in situations where movements take place stepwise, wherein processing of the substrate takes place during standstill of the substrate.

The above stated measures can be applied to a substrate in the form of a continuous carrier, but also to a substrate in the form of separate sheets.

The present invention will be elucidated hereinbelow with reference to the accompanying drawings, in which.

Figure 1:
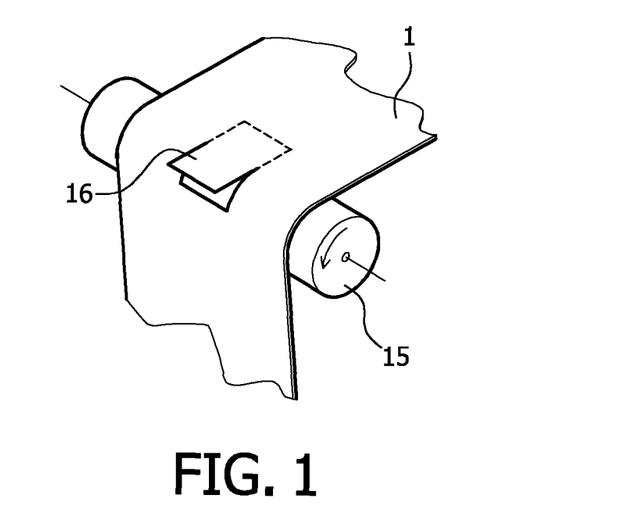
FIG. 1 is a schematic view of a substrate which is guided over a roller after undergoing a laser processing.

FIG. 1 shows a part of a substrate 1 located downstream of a laser processing device. Substrate 1 is here being guided over a roller 15 forming part of the guide means for substrate 1. Together with the guide means following thereon, roller 15 provides for a curvature and a change of direction of substrate 1. This curvature of substrate 1 makes it easier for parts 16, which have been only partially detached during the laser processing, to break away from substrate 1. This takes place all the more easily as the radius of curvature decreases and the stiffness of the substrate increases.

The laser processing and the associated transport of substrate 1 also usually takes place at high speed. When the substrate is subjected to a change in direction, parts 16 which are separated or have limited attachment to substrate 1 will tend to continue along their original path, not only as a result of their own stiffness but also as a result of their mass inertia. This also constitutes a mechanism which enhances the separation between loose parts 16 and substrate 1. It will be apparent that other direction-changing elements can be applied instead of an optionally co-rotating roller 15.

FIG. 1A once again shows the substrate 1 processed by a laser beam, although means are arranged here for causing a pressure difference between the side of the substrate where laser beam 2 impinges on the substrate and the other side of the substrate. Arranged for this purpose is a box 10 which is provided with a gap 11 which extends all around and through which substrate 1 extends. It is however also possible to make use of two gaps, each arranged in opposite sides, through which the substrate extends. Arranged in wall 12 of box 10 on the side of the laser source is a window 13 through which laser beam 2 extends. This window 13 can be closed with a material which is transparent to laser light of the relevant frequency. The volume of box 11 is thus divided into two parts by the substrate. The thus formed parts are coupled to each other by an air pump 14 which serves to generate a pressure difference between the two parts. Various partitions (not shown in the drawings) can of course be arranged in order to prevent short-circuit of the air pressure differential on either side of the substrate.

Figure 1A:
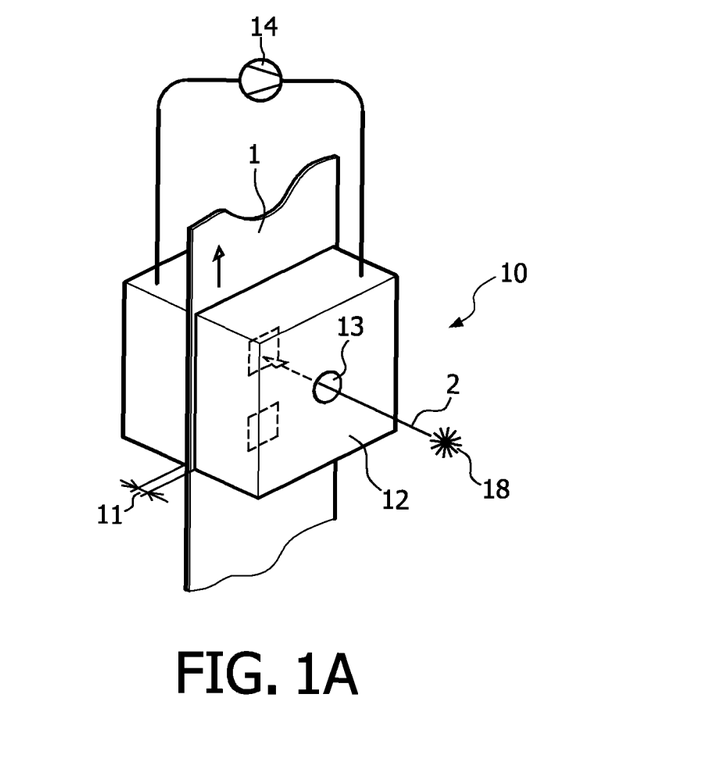
FIG. 1A is a schematic view of a substrate processed by a laser beam, wherein a pressure difference is applied between the two sides of the substrate.

As a result of this pressure difference separated parts of the substrate, which result for instance because spot 3 of laser beam 2 has passed through a closed curve, will be moved by the pressure difference to the side of substrate 1 remote from the laser source. This prevents these detaching parts disrupting the further operation of laser beam 2. It is otherwise also possible for the deflection device of the laser—assuming a sufficiently large dimensioning of box 10—to be placed inside box 10.

Figure 2:
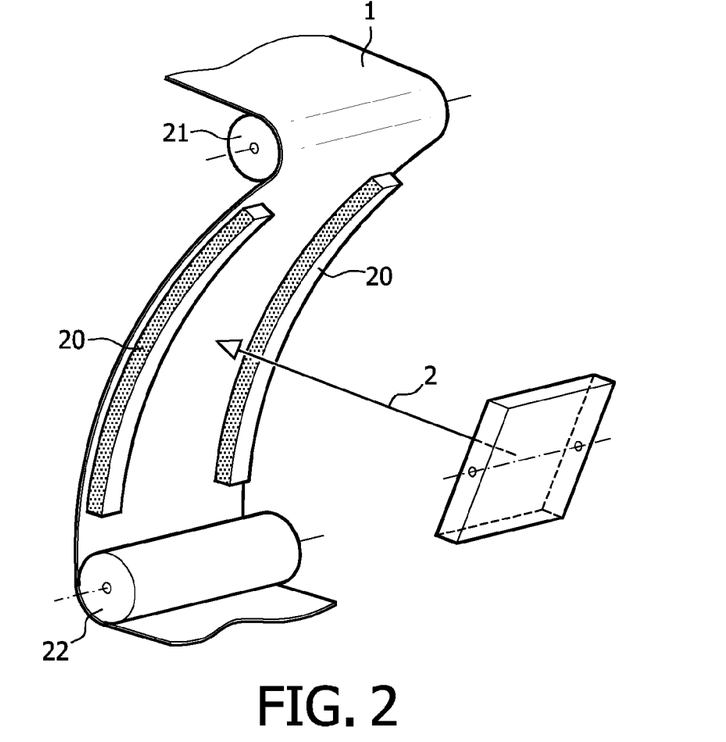
FIG. 2 is a schematic view of a substrate which is guided over curved guides while undergoing a laser processing.

As already stated in the preamble, it is attractive to urge substrate 1, and particularly a substrate with little stiffness, into a curved position during the laser processing. Not only does this enhance the separation between substrate 1 and detached parts due to the change in direction to which the substrate is subjected, but the position of substrate 1 is moreover better defined hereby, so that the position of substrate 1 coincides more precisely with the focus of laser beam 2. FIG. 2 shows a part of the guide means comprising curved guides 20 and a preceding roller 21 and a subsequent roller 22. Assisted by the tension in substrate 1, the two curved guides 20 urge substrate 1 into a single-curved form, thereby increasing the stiffness of the substrate and thereby stabilizing the position transversely of the main direction of the laser beam within the laser operation zone. It is otherwise also possible for the substrate to be curved round an axis extending parallel to or obliquely relative to the direction of movement.

Figure 3:
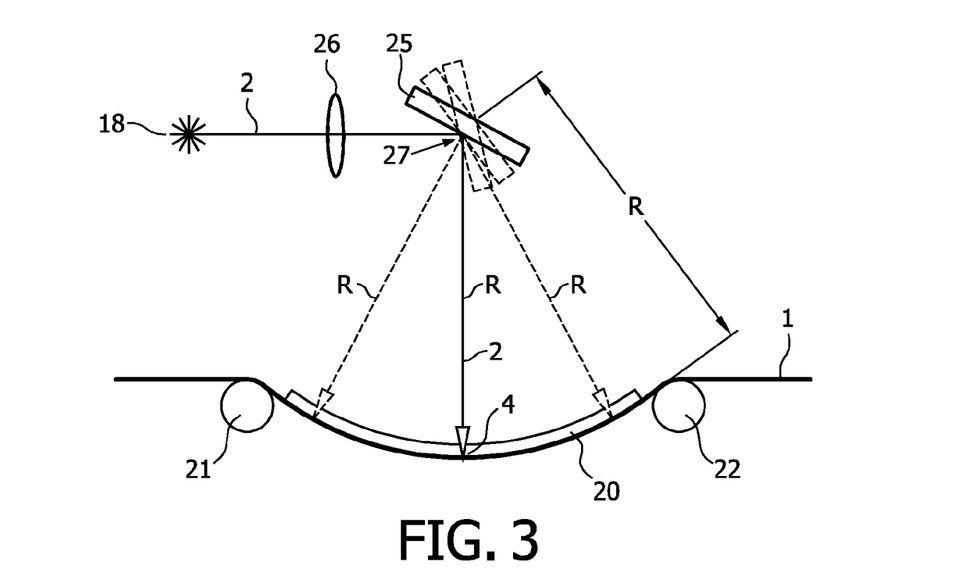
FIG. 3 is a schematic cross-sectional view of the situation shown in FIG. 2.

FIG. 3 shows a sectional view of the same situation, wherein a part of the laser beam 2 carrying out the processing and the elements controlling the position of laser spot 4 are moreover shown. This figure shows how the deflection of laser beam 2 takes place in the plane of the drawing through mirror 25, the axis 27 of which coincides with the centre of the circular arc into which substrate 1 is forced by curved guides 20. As a result of this measure the distance R between mirror 25 and substrate 1 does not depend on the angle of deflection of laser beam 2 through mirror 25, whereby focussing means 26 of laser beam 2 placed between laser source 18 and mirror 15 do not have to carry out any adjustments.

Figure 4A:
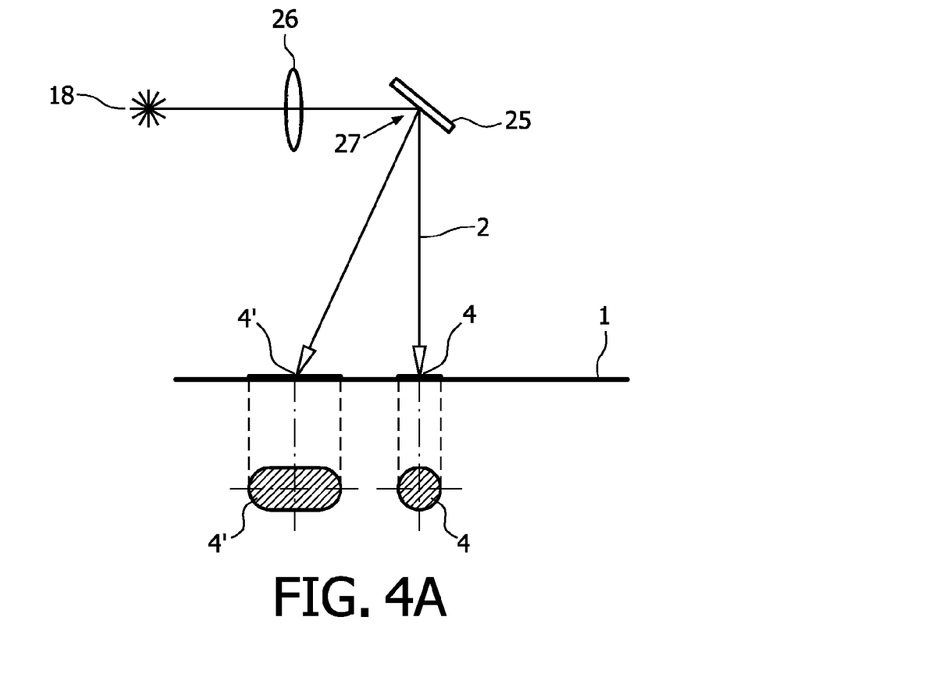
FIGS. 4A and 4B show views corresponding to FIG. 3 of alternative situations.
Figure 4B:
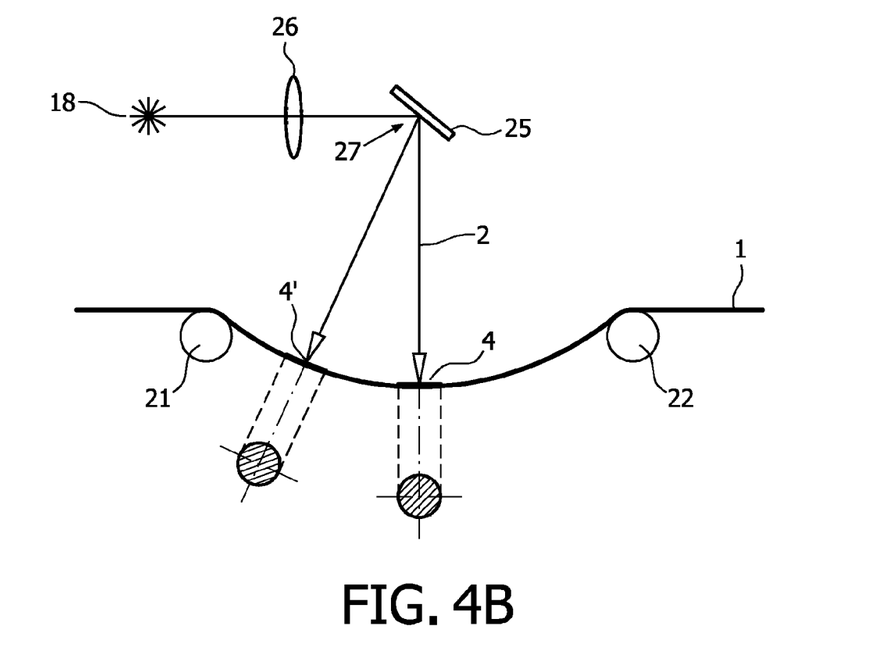

These measures are further elucidated in FIGS. 4A and 4B. FIG. 4A here shows how, in the case of a flat guide and thus flat positioning of the substrate, the distance between deflecting mirror and substrate depends on the angle of deflection of the mirror, this requiring an optical dynamic adjustment in order to maintain the focussing. Laser beam 2 also impinges on substrate 1 at an angle other than 90°, whereby the generally round laser beam 2 causes an oval spot 4' on substrate 1, which reduces the energy density, thereby reducing the effectiveness. FIG. 4B shows how these drawbacks are avoided by the chosen geometry.

It is pointed out that laser beam 2 is not only deflected in the plane of the drawing of FIGS. 3 and 4, but also in the direction transversely thereof. It is possible in principle to have the substrate guided in a curve in a relevant direction in order to obtain the same advantages. Because it is generally not possible to curve the substrate in both directions, it is not possible to combine the two configurations, so that optical adjustment will still always have to be carried out in order to compensate varying path length of the laser beam.

Figure 5:
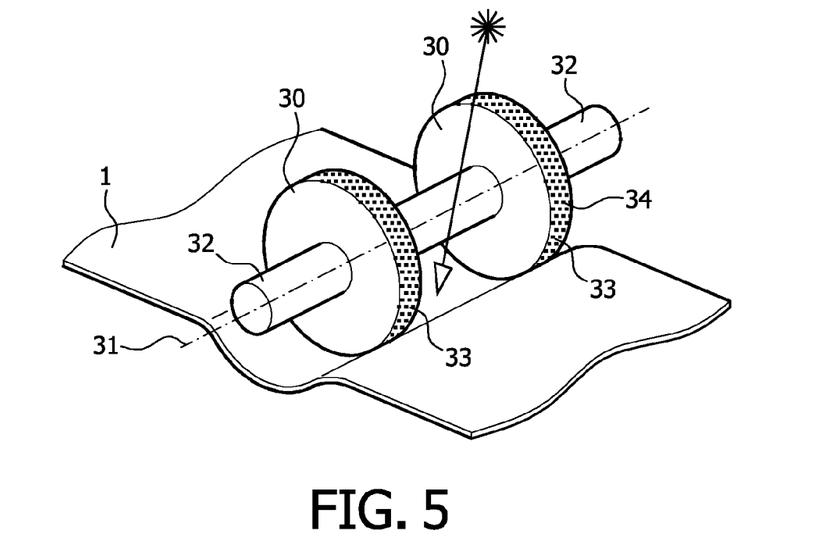
FIG. 5 is a schematic perspective view of an embodiment of the structure shown in FIG. 3.

FIG. 5 shows a schematic view of an embodiment of the guide means for urging the substrate into a curve. As alternative to the curved, strip-like guides of FIG. 2, use is made here of hollow cylinders 30 which are positioned for rotation round the same geometric axis 31. They are each mounted on a shaft end 32. Cylinders 30 are provided on their outer surface 33 with perforations 34. In the interior of cylinders 30 can be applied an underpressure which pulls substrate 1 against outer surface 33 via perforations 34. Means are preferably arranged in the interior of cylinders 30 for only applying a vacuum at perforations 34 at an angle corresponding with the guiding angle, so that substrate 1 can be easily separated from cylinders 31. Use can for instance be made for this purpose of a segment-like part which is placed in cylinders 30 and which is connected to a vacuum pump. It is otherwise also possible to make use of guide rollers or belts for the purpose of pressing substrate 1 against cylinders 30. It will be apparent that the space between cylinders 30 is available for processing the substrate with laser.

Figure 6:
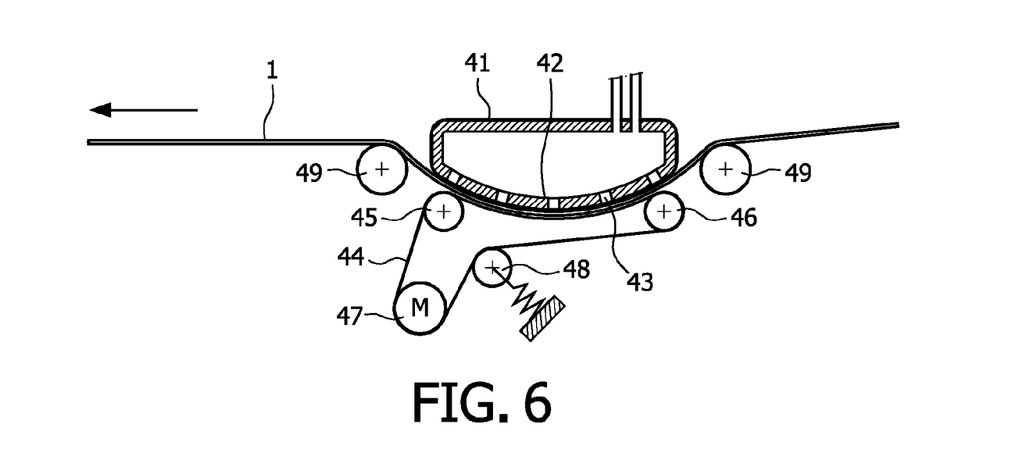
FIG. 6 is a cross-sectional view of another embodiment of the structure shown in FIG. 3.

FIG. 6 shows a sectional view of a second alternative to the configuration of FIG. 2. Instead of guides 20 or cylinders 30, two boxes 41 are here applied which are provided with a curved guide surface 42 in which perforations 43 are arranged. The interior of boxes 41 is connected to a pressure pump, whereby air flows out of perforations 43 and a thin layer of air is formed between the guide surface and the substrate. An air bearing is thus formed. Because an air bearing cannot exert any forces on the substrate, the driving takes place with belts 44 which press the substrate against air bearing 42 and which are tensioned over pulleys 45, 46 and 47, one of which, 47, is driven. Use can otherwise also be made of other drive and tensioning means (not shown in the drawing) for the substrate. A tensioning device 48 for belts 44 is also present. Rollers 49 are moreover arranged. It is of course possible to use other configurations of rollers and belts for the purpose of urging the substrate against air bearing 42.

Figure 7:
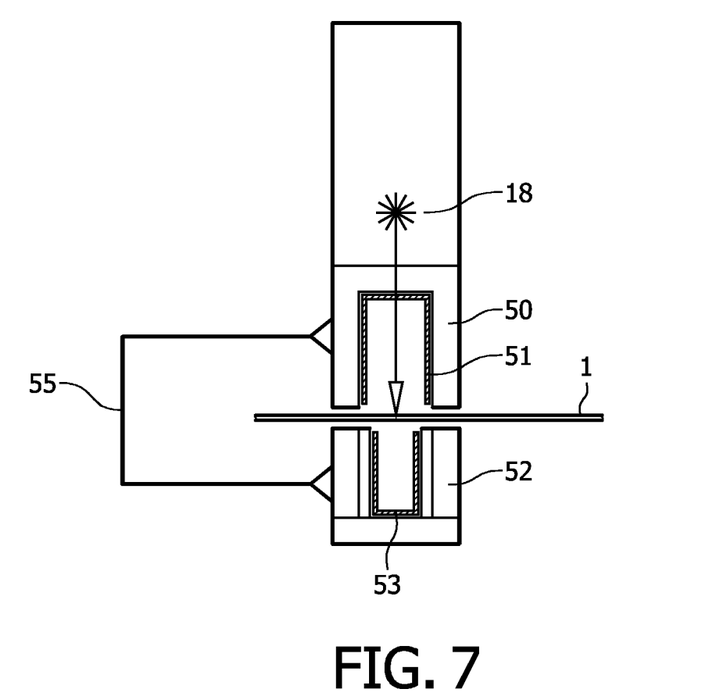
FIG. 7 is a cross-sectional view of a variant of the embodiment shown in figure ???.

FIG. 7 is a schematic cross-sectional view of the laser processing device shown in FIG. 6, wherein the direction of movement of the substrate extends transversely of the plane of the drawing. This figure shows that air bearings 42 of the configuration of FIG. 6 are combined in this embodiment to form a unit 50 on both sides on the top side of substrate 1. Arranged inside this unit 50 is a removable container 51, which can be removed for cleaning purposes. This container is provided on at least its upper surface with an opening or a window which is transparent to the applied laser beam. On the underside the belts and guide rollers are combined into a corresponding unit 52. A removable container 53 is also present inside this unit. In order to enable setting and adjustment of the laser processing device to different paper sizes and processing positions within the substrate, both units present above and below substrate 1 are rigidly connected to each other via a carrier 55 which can be displaced and fixed transversely of the transporting direction of the substrate.

The invention claimed is:
1. Device for processing a movable substrate by means of laser, wherein the processing results in the release of material separated from the substrate, wherein the device comprises: guide means for guiding the substrate; laser processing means adapted to cast onto the substrate a laser spot which processes the substrate in a laser processing zone; and a pump for generating a higher pressure on the side of the substrate where the substrate is impinged by the laser beam than on the other side of the substrate; wherein the guide means comprise two parallel extending guide means adapted to subject the substrate to at least one curvature, the guide means comprising an air bearing comprising two boxes with a curved guide surface in which perforations are arranged, the interior of the boxes being connected with the pump, wherein the laser processing means are situated at least partially between the two parallel extending guide means.

2. Device as claimed in claim 1, wherein the guide means further comprise at least one rotatable cylinder with pressing or suction means for urging the substrate against the rotatable cylinder or the guide means further comprise at least one air bearing with a curved guide surface.

3. Device as claimed in claim 2, wherein the pressing means comprise at least one drive belt, wherein each drive belt is adapted to press the substrate against one of the air bearings or cylinder.

4. Device as claimed in claim 3, wherein the guide means are adapted to subject the substrate to a curvature in the laser operation zone or after the substrate has been processed with laser.

5. Device as claimed in claim 4, wherein the guide means are adapted to direct the concave side of the substrate toward the laser beam.

6. Device as claimed in claim 5, wherein the guide means are adapted to force the substrate into a curvature in the form of a circular arc, and the axis of rotation of a deflecting mirror, which is adapted to deflect the laser beam in the plane of the curvature of the substrate, is situated in the centre of the circular arc.

7. Device as claimed in claim 5, wherein the laser is adapted to process the substrate within an elongate operation zone, and the axis of the curvature extends transversely of the largest dimension of the operation zone.

8. Device as claimed in claim 7, wherein the axis of the curvature extends transversely of the direction of movement of the substrate.

9. Device as claimed in claim 2, wherein the guide means are adapted to subject the substrate to a curvature in the laser operation zone or after the substrate has been processed with laser.

10. Device as claimed in claim 9, wherein the guide means are adapted to direct the concave side of the substrate toward the laser beam.

11. Device as claimed in claim 10, wherein the guide means are adapted to force the substrate into a curvature in the form of a circular arc, and the axis of rotation of a deflecting mirror, which is adapted to deflect the laser beam in the plane of the curvature of the substrate, is situated in the centre of the circular arc.

12. Device as claimed in claim 10, wherein the laser is adapted to process the substrate within an elongate operation zone, and the axis of the curvature extends transversely of the largest dimension of the operation zone.

13. Device as claimed in claim 12, wherein the axis of the curvature extends transversely of the direction of movement of the substrate.

14. Device as claimed in claim 1, wherein the guide means are adapted to subject the substrate to a curvature in the laser operation zone or after the substrate has been processed with laser.

15. Device as claimed in claim 14, wherein the guide means are adapted to direct the concave side of the substrate toward the laser beam.

16. Device as claimed in claim 15, wherein the guide means are adapted to force the substrate into a curvature in the form of a circular arc, and the axis of rotation of a deflecting mirror, which is adapted to deflect the laser beam in the plane of the curvature of the substrate, is situated in the centre of the circular arc.

17. Device as claimed in claim 15, wherein the laser is adapted to process the substrate within an elongate operation zone, and the axis of the curvature extends transversely of the largest dimension of the operation zone.

18. Device as claimed in claim 17, wherein the axis of the curvature extends transversely of the direction of movement of the substrate.

* * * * *

UNITED STATES PATENT AND TRADEMARK OFFICE
CERTIFICATE OF CORRECTION

PATENT NO. : 8,563,895 B2  
APPLICATION NO. : 12/863830  
DATED : October 22, 2013  
INVENTOR(S) : Johannes Ignatius Marie Cobben Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Fifteenth Day of September, 2015

Michelle K. Lee
*Director of the United States Patent and Trademark Office*